(12) United States Patent
Tangager

(10) Patent No.: US 11,065,789 B2
(45) Date of Patent: Jul. 20, 2021

(54) METHOD FOR ESTABLISHING OF EROSION RESISTANT SURFACE PART ON A WIND TURBINE BLADE, METHOD FOR CREATION OF AN EROSION RESISTANT COATING, WIND TURBINE BLADE WITH RETROFITTED COATING IN AND AROUND AREAS WHERE THE BLADE IS ESPECIALLY EXPOSED TO EROSION DAMAGES, COATING FOR MOUNTING ON A WIND TURBINE BLADE'S FRONT EDGE

(71) Applicant: Blade Repair Solutions IVS, Hadsund (DK)

(72) Inventor: Kim Tangager, Hadsund (DK)

(73) Assignee: Blade Repair Solutions IVS, Hadsuns (DK)

( * ) Notice: Subject to any disclaimer, the term of this patent is extended or adjusted under 35 U.S.C. 154(b) by 240 days.

(21) Appl. No.: 16/066,384

(22) PCT Filed: Dec. 13, 2016

(86) PCT No.: PCT/DK2016/050428
§ 371 (c)(1),
(2) Date: Jun. 27, 2018

(87) PCT Pub. No.: WO2017/114528
PCT Pub. Date: Jul. 6, 2017

(65) Prior Publication Data
US 2019/0001534 A1   Jan. 3, 2019

(30) Foreign Application Priority Data
Dec. 28, 2015   (DK) ............................ PA 2015 70881

(51) Int. Cl.
B29C 41/02 (2006.01)
B29C 65/48 (2006.01)
(Continued)

(52) U.S. Cl.
CPC ............. B29C 41/02 (2013.01); B29C 41/20 (2013.01); B29C 65/48 (2013.01);
(Continued)

(58) Field of Classification Search
CPC combination set(s) only.
See application file for complete search history.

(56) References Cited

U.S. PATENT DOCUMENTS 5,498,307 A * 3/1996 Stevenson ........... B29C 37/0025
156/244.16
5,782,607 A * 7/1998 Smith ...................... C25D 7/00
416/224

(Continued)

FOREIGN PATENT DOCUMENTS

EP   2827482 A2   1/2015
EP   2927482 A1   10/2015
(Continued)

Primary Examiner — David Hamaoui
Assistant Examiner — Wayne A Lambert
(74) Attorney, Agent, or Firm — Gable Gotwals

(57) ABSTRACT

This invention relates to a wind turbine blade with retrofitted coating in and around areas where the blade is especially exposed to erosion damages, which is established by the coating including a glue layer, a fiber reinforced polymer layer and one or more non-reinforced polymer layers over the fiber reinforced layer, since the polymer layers stretch themselves out over the fiber reinforced layer and includes areas of the wind turbine blade's surface, which are less exposed to erosion damages. A method for creation of such a wind turbine blade and creation of such a coating and the coating itself, is also established with the invention.

12 Claims, 6 Drawing Sheets

Figure 1:
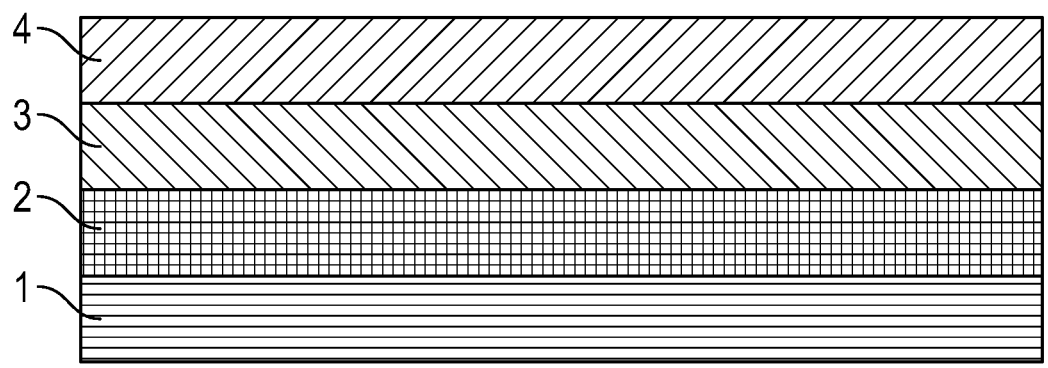

(51) Int. Cl.
*B29C 65/00* (2006.01)
*B29C 41/20* (2006.01)
*B29C 70/36* (2006.01)
*F01D 5/00* (2006.01)
*F03D 80/55* (2016.01)
*F03D 1/06* (2006.01)
B29L 31/08 (2006.01)
B29K 105/08 (2006.01)
B29D 99/00 (2010.01)
B29C 41/12 (2006.01)

(52) U.S. Cl.
CPC ...... *B29C 66/02245* (2013.01); *B29C 66/723* (2013.01); *B29C 66/72141* (2013.01); *B29C 70/36* (2013.01); *F01D 5/005* (2013.01); *F03D 1/0675* (2013.01); *F03D 80/55* (2016.05); B29C 41/12 (2013.01); B29C 66/30322 (2013.01); B29C 66/532 (2013.01); B29C 66/7212 (2013.01); B29D 99/0025 (2013.01); B29K 2105/08 (2013.01); B29L 2031/085 (2013.01); F05B 2220/30 (2013.01); F05B 2230/90 (2013.01); F05B 2240/30 (2013.01); F05B 2250/71 (2013.01); F05B 2260/95 (2013.01); F05B 2280/5007 (2013.01); F05B 2280/6001 (2013.01); F05B 2280/6003 (2013.01); F05B 2280/6011 (2013.01); F05B 2280/6013 (2013.01); F05D 2230/80 (2013.01); F05D 2230/90 (2013.01); Y02E 10/72 (2013.01); Y02P 70/50 (2015.11)

(56) References Cited

U.S. PATENT DOCUMENTS

| | | | | |
|---|---|---|---|---|
| 6,457,943 | B1 * | 10/2002 | Olsen | F03D 1/0675 244/1 A |
| 7,811,063 | B2 * | 10/2010 | Bonnet | F03D 1/0675 416/229 R |
| 8,038,407 | B2 * | 10/2011 | Rao | F03D 1/0675 416/224 |
| 8,043,065 | B2 * | 10/2011 | Kyriakides | F03D 1/0675 416/223 R |
| 2003/0047822 | A1 * | 3/2003 | Hori | B29C 33/42 264/1.21 |
| 2005/0042102 | A1 * | 2/2005 | Teichert | B08B 1/04 416/146 R |
| 2007/0036659 | A1 * | 2/2007 | Hibbard | B29C 66/1282 416/233 |
| 2010/0132109 | A1 * | 6/2010 | Kim | B29C 41/20 4/584 |
| 2012/0034094 | A1 * | 2/2012 | Wansink | B29D 99/0025 416/230 |
| 2012/0061007 | A1 * | 3/2012 | Gunther | B29C 65/4845 156/94 |
| 2013/0022472 | A1 * | 1/2013 | Hayden | B29C 70/745 416/230 |
| 2013/0045105 | A1 | 2/2013 | Driver et al. | |
| 2013/0101426 | A1 * | 4/2013 | Saitou | F03D 1/0675 416/224 |
| 2013/0294923 | A1 * | 11/2013 | Takeuchi | F01D 5/286 416/241 A |
| 2015/0337447 | A1 * | 11/2015 | Gatley | C25D 5/12 428/660 |
| 2016/0208773 | A1 * | 7/2016 | Theile | B32B 25/16 |
| 2017/0314532 | A1 * | 11/2017 | Kirkegaard | C08G 18/7671 |
| 2018/0209400 | A1 * | 7/2018 | Drachmann Haag | B32B 37/24 |
| 2018/0230966 | A1 * | 8/2018 | Drachmann Haag | B29C 65/16 |
| 2019/0226458 | A1 * | 7/2019 | Sanderson | F03D 80/50 |

FOREIGN PATENT DOCUMENTS

| | | | |
|---|---|---|---|
| WO | 2004076852 A2 | 9/2004 | |
| WO | 2005054672 A1 | 6/2005 | |
| WO | 2010117262 A1 | 10/2010 | |
| WO | 2015015202 A1 | 2/2015 | |
| WO | WO-2015015202 A1 * | 2/2015 | ........ F03D 1/0675 |
| WO | WO-2018219524 A1 * | 12/2018 | ........ F03D 1/0675 |

* cited by examiner

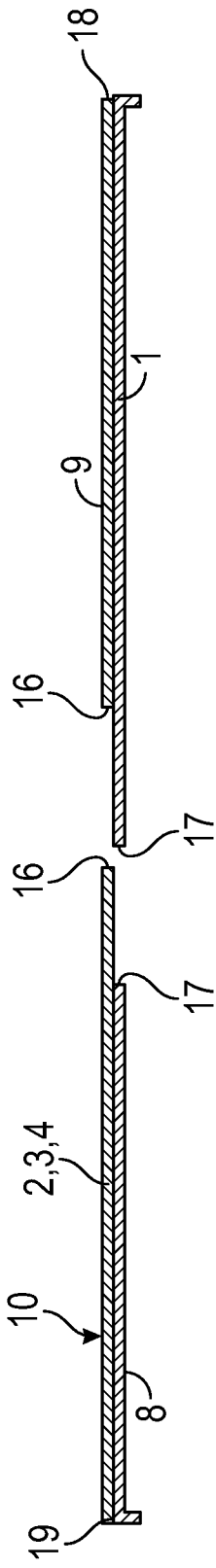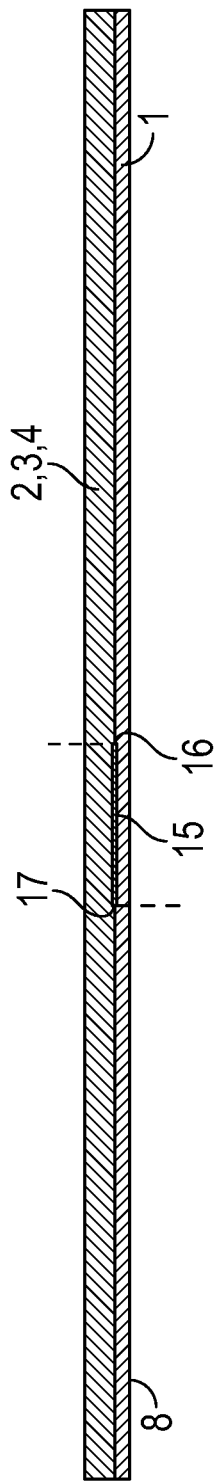

METHOD FOR ESTABLISHING OF EROSION RESISTANT SURFACE PART ON A WIND TURBINE BLADE, METHOD FOR CREATION OF AN EROSION RESISTANT COATING, WIND TURBINE BLADE WITH RETROFITTED COATING IN AND AROUND AREAS WHERE THE BLADE IS ESPECIALLY EXPOSED TO EROSION DAMAGES, COATING FOR MOUNTING ON A WIND TURBINE BLADE'S FRONT EDGE

CROSS-REFERENCE TO RELATED APPLICATIONS

This application is the United States National Phase of Patent Application No. PCT/DK2016/050428 filed 13 Dec. 2016, which claims priority to Dutch Patent Application No. PA201570881 filed 28 Dec. 2015, each of which are incorporated herein by reference.

BACKGROUND OF THE INVENTION

It has been found that part of the many wind turbines, which are set up over time, do not always have blades, whose surfaces can resist the erosion they are exposed to during operation. Especially the newer long wind turbine blades have been found to cause problems, since the relative speed between the air and the wing's surface is here quite high, and the accelerated test methods, which have hitherto been used, do not always provide accurate results for this type of blades. There is therefore an increasing need for a coating, which can be retrofitted on older wind turbine blade, especially those with beginning or advanced surface damages caused by particles in the atmosphere.

It is known that one can establish a new coating on a wind turbine blade by raising a basket with personnel up to the blade and then directly apply or spray on various hardening polymer coatings, possibly including fiber reinforcement. This process is both dangerous and complicated and it also places demands for the weather, which for many wind turbines' concern, is only achieved quite few days per year.

It is also known to take down wind turbine blades and then in a suiting factory floor establish a new and more erosion resistant surface with use of conventional techniques known from the fiberglass technology. It is however demanding and the craftsmanlike processes can easily entail that there is introduced mistakes, which then first show themselves after the blade is put into operation after ended finishing.

It is therefore an object of the invention to show a method for establishing of an erosion resistant surface part on a wind turbine blade, which does not have the mentioned drawbacks.

This is achieved with a method as stated in claim 1. The special feature of the method is that the coating is made by molding on a model of a wind turbine blade's surface part (a so-called plug) that the plug is arranged such that it has the equivalent of the blade's front edge upwards, that the coating is ejected from the plug and is after processed and that the coating is glued on the actual wind turbine blade, since the front edge line on the coating aligns with the front edge line on the wind turbine blade. In this way one can ensure that there is full control of all casting parameters during the manufacturing process. There can also be established a quality control of the finished molded coating, and should there have been occurred faults during the process, it is easy to mold a new coating. This is in no way possible when there, as is known, is worked directly with casting on a wind turbine blade, for here it is partly difficult to quality test the newly established surface, and should errors be found, it is a very difficult process to remove the faulty coating. By the preparation of a plug initially, this must either be manufactured and if it is already manufactured, it must be cleaned for leftovers of a possible previous casting and be put correctly up.

It is known that the old wind turbine blade must be cleaned off thoroughly before there is glued new surface parts fixed on this, but it has now surprisingly been found that sand blasting with $CO_2$ in solid particle shape, as stated in claim 2 ensures that all foreign objects and loose elements are removed from the surface.

By this type of new coatings it is especially important that the transition between areas with, and areas without, coating occurs gradually, such that there does not come edges or beads, which can break the air current around the blade profile. Here, it is especially an advantage to work with casting on a plug, since it for examples provides possibility for finishing of the casted coating from the inner side. This is used for finishing the brim area by polishing on the internal side, which is the side, which faces towards the wind turbine blade's surface. This means that the side, which faces away from the wind turbine blade's surface remains non-processed, and the advantage is here that the freely casted surface, which is quite even as a result of the polymer's floating characteristics, is not affected or changed by the processing.

By the method according to the invention, one can, as stated in claims 4 and 5, either place the whole coating on a wind turbine blade's surface in one working procedure or one can work with predetermined lengths of the coating, which are mounted individually after each other on the blade's surface. If a turbine blade is taken down and one has it in controlled surroundings, for example in an assembly hall, one can reasonably easily work with glueing the whole newly formed coating on in one and the same working procedure, but if one works in a basket, which is for example raised up to the blade in a nacelle, it is significantly easier to work with predetermined lengths of the coating, for example lengths of 1 to 5 meters length, however preferably 2 to 4 meters length. These part coatings are then glued in place one after one in the same order, which they lay in by the casting, such that the connections can be made fully precise without cracks or double coating. There can be established special overlap by the ends on the predetermined lengths having a gradual reduction in each end, where the gradual reduction in the one end is, from the away from the wind turbine blade facing surface, while the one in the opposite end is from the towards the wind turbine blade's surface facing surface. Such two gradual reductions can be placed over each other without a bead occurring on the place and it will then also result in an improved durability, especially since there will not be any crack between the, after each other following, lengths, which could risk to be especially sensitive to erosion.

By the molding process, there can appropriately be set up a fiber-reinforcement of the coating, especially in the parts of the wind turbine blade's profile, which are most exposed to erosion. It is done in practice, as shown in claim 6, by there on the plug, along the front edge line, being placed a cohesive fiber mat, which proceeds from the front edge line and a suiting distance down along each side. The mixed polymer (in the case of two-component polymer) is poured hereupon down in the fiber mat along the front edge line since there is dosed so abundantly that the fiber mat is soaked and the polymer also flows out of the fiber mat on each side and down along the side of the plug. There must by this process be formed a cohesive layer of polymer in connection to the fiber mat, at each side, and this cohesive layer must stretch itself a suiting distance down along the side of the plug. When the liquid polymer is dosed, the area along the fiber mat's ending brim area must by each side be burnished with a tool, such as a scraper, such that there can come an even transition without drops, which can otherwise be formed here. The fiber mat's suiting width in relation to the front edge can depend on how wide the front edge is and how erosion strained a place on the wind turbine blade there is worked, but a distance from the mat's brim to the front edge line of between 5 and 10 cm will be suiting in most cases. The cohesive fiber free polymer film, which is formed out over the fiber reinforcement's width, must have a maximum length from the front edge line measured along the side of the profile of from 10 to 25 cm. The process with pouring self-hardening polymer on the top of the plug is repeated until a suiting layer thickness is achieved and typically is achieved a layer thickness of around 1300 μm after around 4 layers.

Claim 7 states the process steps by which a scaling down of the ends of predetermined lengths of the coating can be established. It is done by, after mounting of the fiber mat on the plug, placing transverse plastic foil across the plug. The plastic foil must be shaped as identical width strips, which do not attach to the used polymer by the casting and the foil must also be with a very low material thickness. By the subsequent casting, there is with the foil strips established a separable connection between the fiber layer and the overlying layers without fibers. This is then used by the cutting up to the predetermined pieces by the cutting through occurring along both edges of the plastic strip, such that, along the one edge, is only cut through the fiber reinforced part of the coating and the polymer layers above are left undamaged, while there along the opposite edge is cut from the opposite side and only through the casted polymer layers without damaging the fiber reinforced layer. The process provides a gradual reduction in each end, and by the glueing of the coating on the final place on the wind turbine blade, the gradual reductions can be used for creating overlap from the one predetermined length to the next. Then, the overlap zone has the same thickness as the rest of the coating and there will not be found cracks between the coating parts, which could be sensitive to erosion effects.

As shown in claim 8, the glueing on the wind turbine blade should occur from below the tip end and up towards the root end since a predetermined coating piece is put on, such that it has a gradual reduction only with fiber reinforced part facing towards the root end. This fiber reinforced coating then gets a polymer coating applied by the next coating piece's inflow to the blade, since this is mounted such that its polymer edge phase-out overlaps the previous piece's fiber reinforced phase-out.

As explained in claim 9, the glueing occurs by application of glue on both the coating's, towards the wind turbine blade facing, surface and on the wind turbine blade itself, and hereafter the two parts are connected, since it must however be inspected that there does not occur pockets of air at the joint. It can also be a possibility to subsequently adjust the position of parts of the coating immediately after the glueing in order to achieve the correct placement, but by choosing a glue type without too strong a stroke, this can easily be made possible.

The tip itself is a chapter in itself, for here it is desired that the fiber reinforcement proceeds the whole way around the tip. It requires that there is here sewn or assembled a fiber bag, which fits to the tip and which can subsequently be mounted on the plug's, to the wind turbine blade corresponding, tip. After the casting, this bag can then be mounted with glue on the wind turbine blade's tip. Hereby is created a strong and very secure protection of the tip.

An embodiment of the invention concerns the processes, which are to be carried out to create the product, which the coating constitutes. By implementing these processes is achieved a coating with superior characteristics in terms of resistance to erosion and in the form of adhesion ability to a wind turbine blade. In particular, the polymer layers, which are extending beyond the fiber-reinforced layers are contributing to ensure the power of resistance towards tearing of the coating, which may occur from the forces generated by for example ice formation of a wind turbine blade in operation. At the same time, these coating layers help to provide a gradual transition between the parts of the wind turbine blade, which have received coating, and the parts where there is no coating.

An embodiment of the invention concerns the wind turbine blade itself and the special characteristics it achieves when there, on it, is mounted a coating including a fiber reinforced polymer layer along the front edge line and polymer layer, which stretches itself out from here and down along each side of the blade's profile.

An embodiment of the invention concerns the coating itself, as such, and the special characteristics, which are related thereto.

Figure 2:
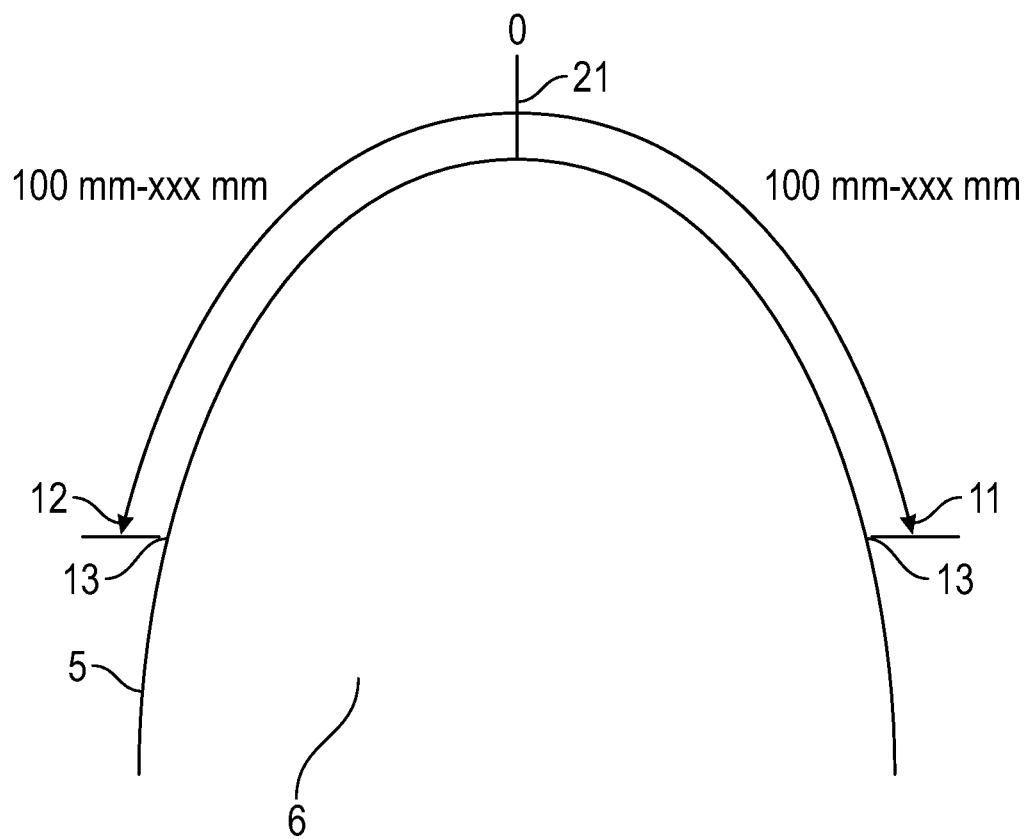
Figure 3:
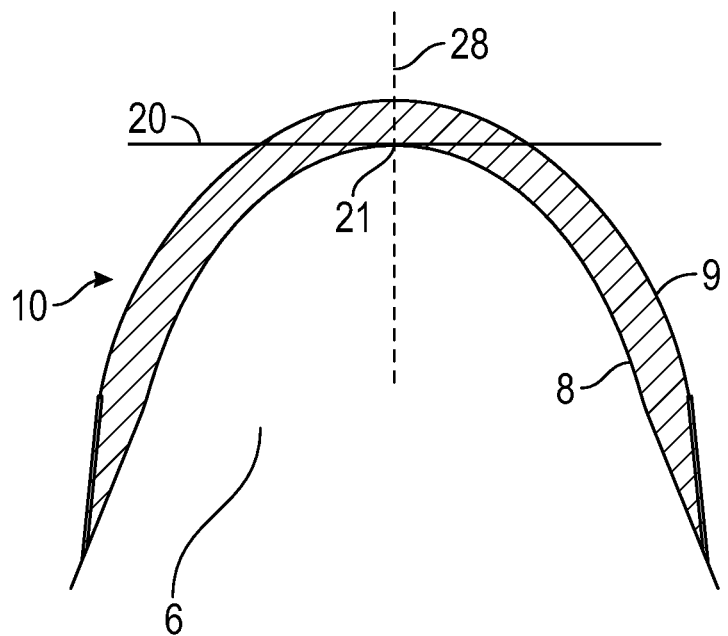
Figure 4:
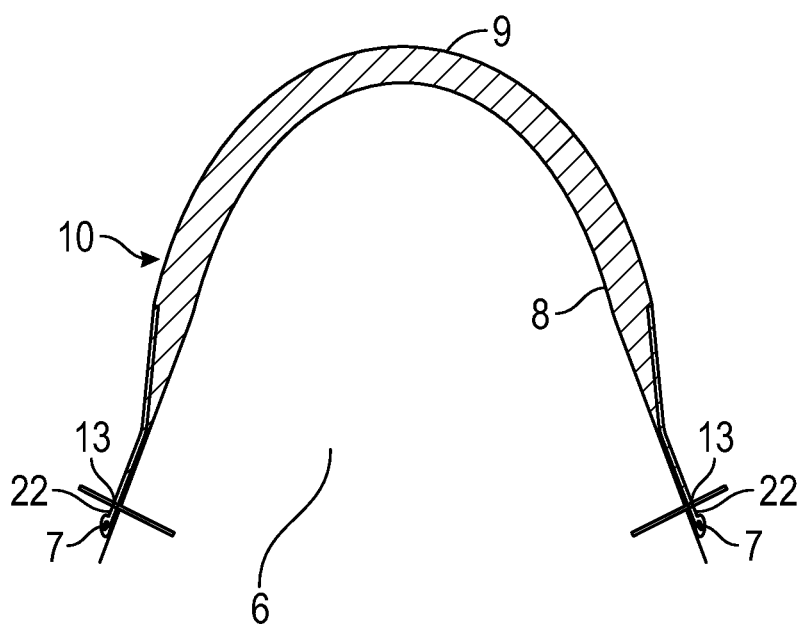
Figure 5:
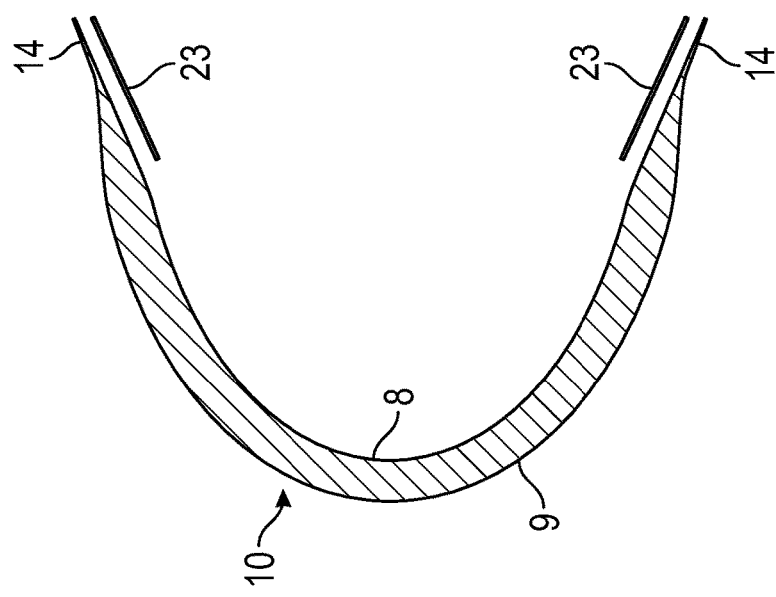
Figure 6:
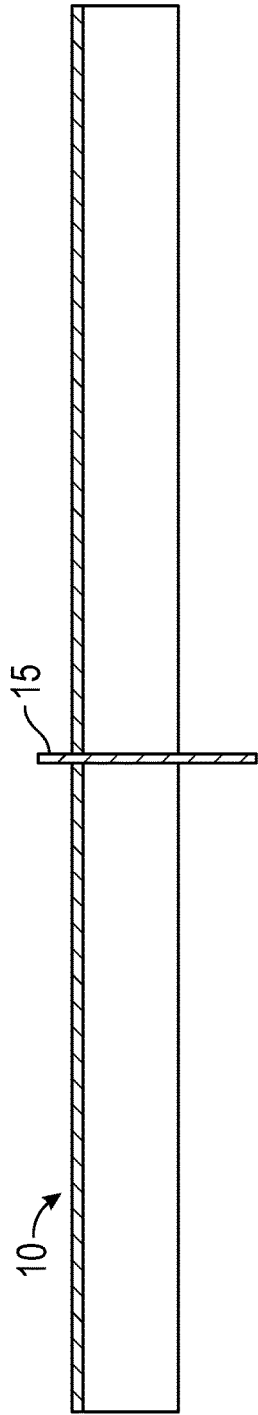
Figure 9:
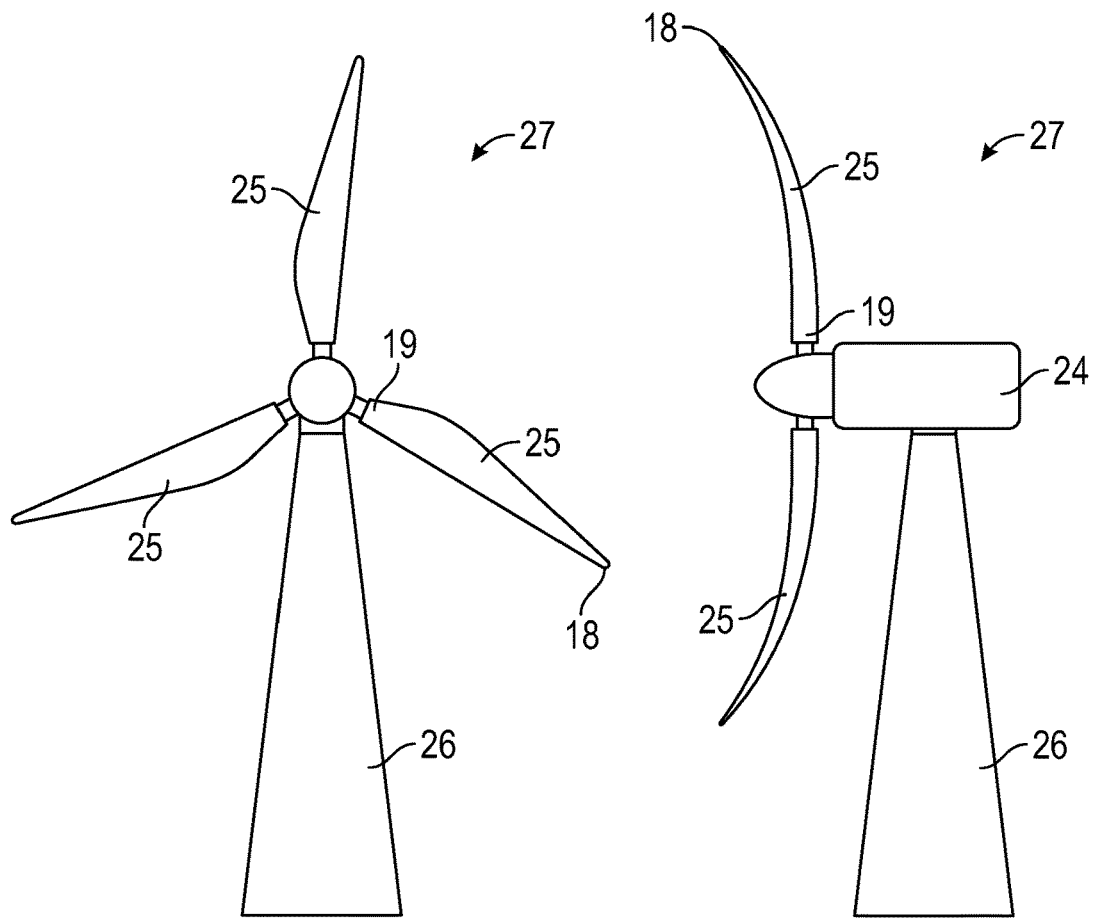
Figure 10:
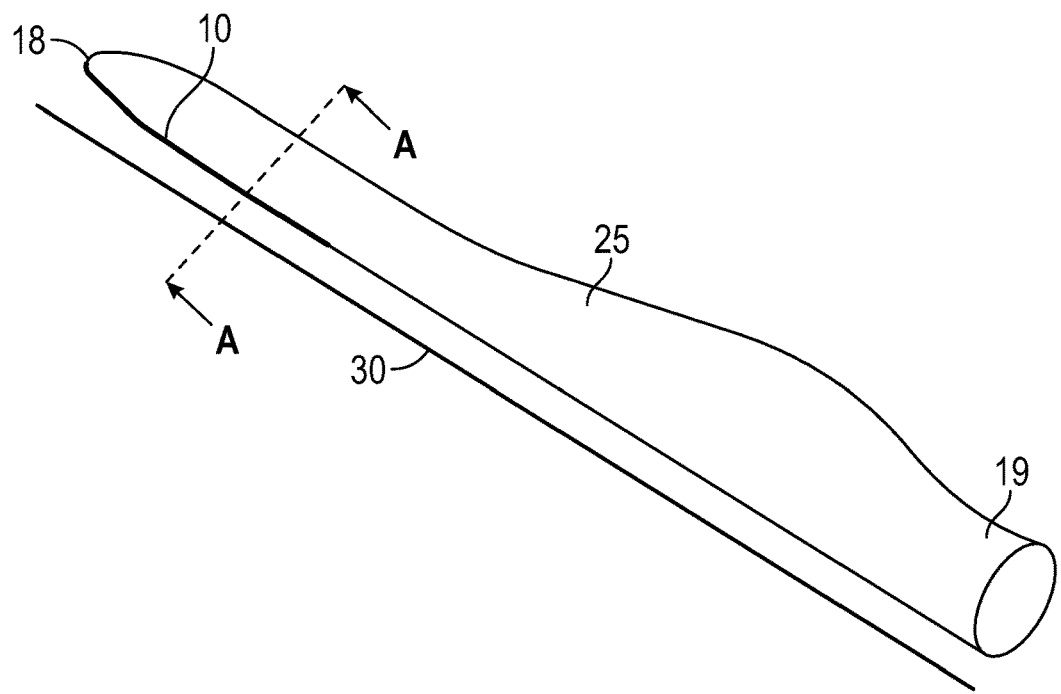
Figure 11:
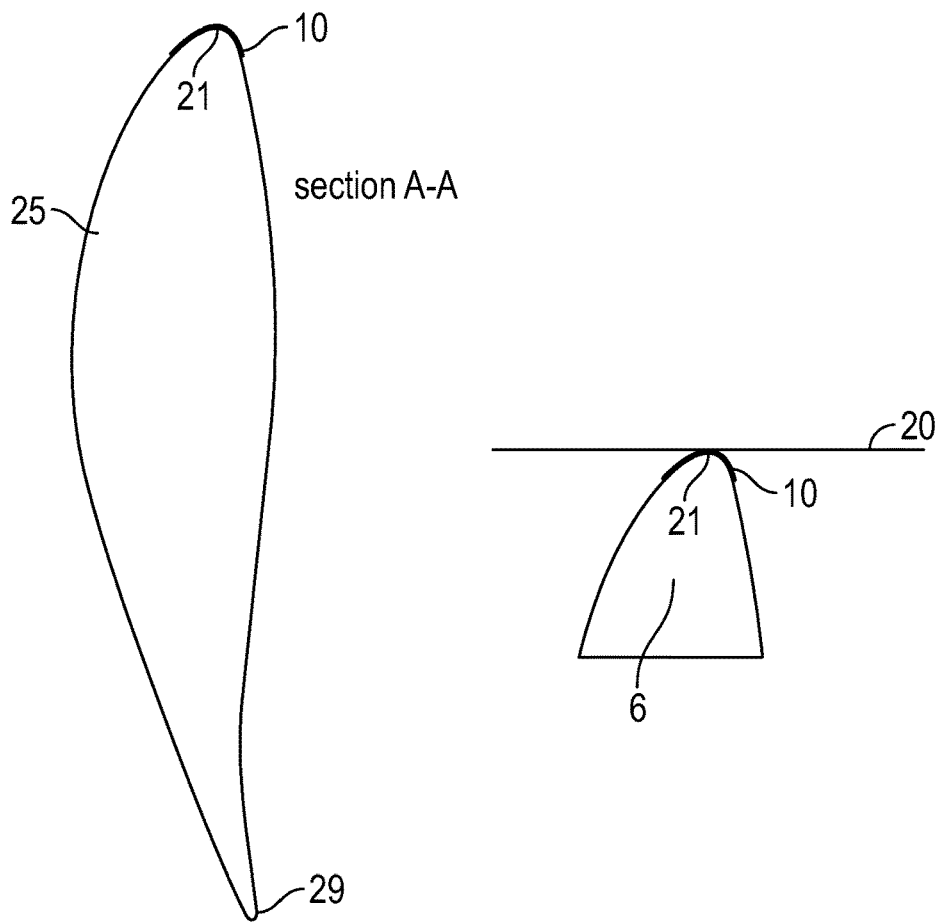
Figure 12:
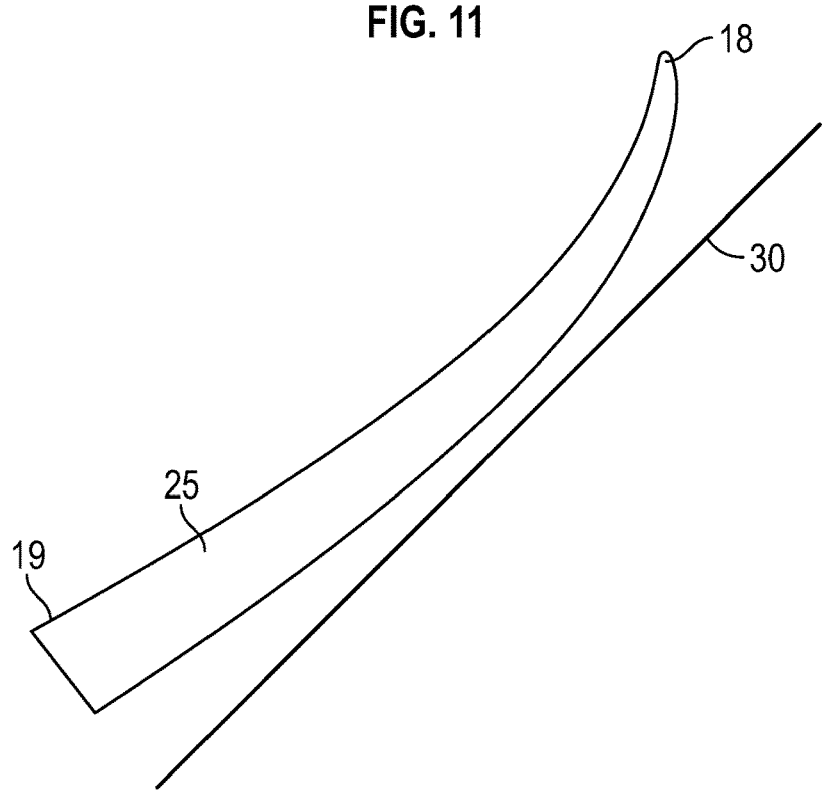

The invention will now be explained more fully with reference to the drawings, on which:

FIG. 1 shows a section in schematic form, through a coating,

FIG. 2 schematically shows how a plug has a front edge line, which has a horizontal tangent, and how distances can be measured from the front edge line and down along the sides of the plug, FIG. 3 shows section across a plug without casted layers, FIG. 4 shows the same section as FIG. 3, but with more details, FIG. 5 is a reproduction of the coating after demoulding, FIG. 6 shows a segment of a plug, seen from the side, with mounted plastic strip across the plug, FIG. 7 shows cut through coating segments, which are cut-out from each other by the plastic strip, FIG. 8 shows a cut similar to the one in FIG. 7, but before the two, on each other following coating segments are separated, FIG. 9 shows a sketch of an ordinary wind turbine with 3 turbine blades, from the front and from the side, FIG. 10 is a sketch of a turbine blade in 3D view with indication of a coating 10 according to the invention, FIG. 11 is a sectional view of a wind turbine blade 25 and hereto equaling plug 6 of the type, which is shown in FIG. 10 and with indication of the coating 10 and FIG. 12 shows a side image of the turbine blade shown in FIG. 10.

In FIG. 1 is seen a schematic cut through a layered coating 10.

The coating 10 includes a number of polymer layers 1, 2, 3, 4, which are mutually interconnected, since the one layer is casted on top of the next within the time frame, which the manufacturer prescribes in order to ensure a suiting polymerization effect between the individual layers. The used polymer can for example be a LEP 4601, which is produced and sold by 3M under the trade name 3M LEP 4601. This polymer is moisture hardening and the polymerisation time will then depend on local conditions such as temperature and humidity in the room, where the layers are casted. The lowermost layer 1 is different from the additional layers by including a fiber reinforcement. The fibers can be glass, metal, aramid or carbon composites or mixtures hereof. As usual, the fiber reinforcement will be a well-known woven and or felted product with one, two or three axis weaving. The fiber reinforcement can thus include a woven layer and a layer of the type "chopped mat". Chopped mat includes relatively long parallel bundles of fibers, which are placed randomly between each other in a shared plane. In retailers, such fiber reinforcements are acquired under names such as: UD650, BIAX600 and TRIAX900.

The fiber reinforced layer 1 is thus formed by laying the fiber reinforcement up on a mold surface 5, and then pouring the polymer down into the fiber reinforcement until this is saturated and the polymer flows out of the fiber layer and out on a surrounding mold surface. The fiber reinforced layer 1 is a classic fiber coating, where a polymer filler fills the gaps between elongated, ordered or non-ordered fibers of glass or other material with high E-module and high breaking strength. The subsequent layers, 2, 3 and 4 are formed by the same method on top of layer 1, but without adding additional fiber material, since the same or a similar polymer is poured out over of the previous layer, and is here allowed to harden in part before the next layer is applied. In order to achieve a uniform layer thickness, the surface, which the layers are formed on, must be sloping, and must not include cavities or local descends, in which the polymer can accumulate itself and form puddles. Such a surface is formed, for example by an elongated u-profile similar to a blade profile with a front edge line 21. On the front edge 21, the U-section will have a horizontal tangent 20, but on all other points, the surface's tangent will, across the u-profile, be angled in relation to horizontal, and approach vertical, the further away from the apex or the front edge line one plots the tangent. FIG. 1 can thus be a cut through a layer divided surface part formed on an elongated u-profile, where the cut is placed in the u-profile's longitudinal direction and through the top point.

A U-profile is shown on FIG. 2, seen from the end, and here, the top point is marked with a "0", and with each own arrow 11, 12, the distance from the top point and down to a predetermined place 13 on the profile's outer side, measured along the profile's surface, is indicated. Here is shown the same distance to both sides, and this can vary between 100 mm and a random distance provided by xxx mm.

According to the invention, an erosion resistant surface part is established on a wind turbine blade 25, since there is initially formed a copy of the outer geometry of the wind turbine blade's surface part, a so-called plug 6. This can be formed from drawings of the wind turbine blade 25, or from measurement made on the blade itself, which must receive the surface part or by measurement of a corresponding blade. The plug 6 can be 3D printed or manufactured from foam plastic or similarly light material on the basis of well-known techniques for formation of casting moulds for large fiber reinforced items.

In cases where it is a front edge of the wind turbine blade, which must receive the coating, the plug 6 is put up, such that the front edge faces upwards, whereby the plug's outer geometry will get to look roughly like the u-profile shown in FIG. 2. A cut through a wind turbine blade and a cut through a hereto similar plug on the same place, is shown in FIG. 11. The wind turbine blade's 25/the plug's 6 front edge will, when it faces upwards, have a horizontal tangent 20 on its top point and from here, a similar plug's outer side will slant more and more, equaling that a tangent will approach more and more a vertical position. It is presupposed that the top point will be placed on the blade's front edge line 21, even though this is not an absolute truth. The front edge line can thus vary, for example in relation to how the blade is angled during operation. But if the blade/the plug is put upright, it can be placed such that the most common front edge line during operation gets to be placed close to the geometric top point, which is the position on the upwards facing surface, where a transverse tangent 20 is horizontal. If one continues downwards along the wind turbine blade's sides, one will reach a point where the tangent's slope in relation to horizontal becomes over 90 degrees and here, the profile begins to reduce itself towards a joint rear edge 29, where the two sides meet again. The plug's 6 surface thus creates a casting mould for casting of the surface coating, which is geometrically and in size terms similar with a suiting part of a turbine blade's front edge and belonging sides.

It is desired that the coating 10, which is moulded with the plug 6 as mould, can again be ejected from here, and therefore, the plug is initially coated with a demolding agent (not shown in the figures). It may be a conventional parting agent or a surface treatment such as for example a form of nano-coating or it can be a so-called "booth-coat", which is known from lacquer booths. This coat forms a coherent film, which, however, has poor adhesion ability to a base, such that paint or varnish, which lands on this can easily be peeled off together with the booth coat, when there is for example formed such a thick layer that it is dangerous or bothersome. In this case, the booth-coat is useful as parting agent, since it does not attach to the plug's surface, but forms a coherent mechanically stable film, which one can be cast on top of. When the casted item is ejected, there possibly sits remains of booth-coat film on this, but since the item in this case must nevertheless be exposed to a processing with sandpaper in order to secure attachment by the later glueing to the wind turbine blade's surface, it does not have any significant importance.

On the booth coated plug 6, is now cast an erosion resistant coating 10 across the front edge line 21 hereof and down along the sides to a predetermined distance from the front edge line 21 and the coating 10 is ejected from the plug 6 after ended hardening.

Hereafter, the coating 10 can be glued onto a wind turbine blade's surface part, since it is ensured that it gets the same placement on the actual wind turbine blade 25, which it had on the plug 6. In particular, it is important that the molded coating 10, when it is installed, will have the same front edge line 21 on the wind turbine blade 25, which it had when it became casted on the plug 6. By following this methodology in the establishment of an erosion-resistant coating 10 on a wind turbine blade 25, it can be ensured that the coating is tensionfree when it is installed and it will then have maximum strength. By casting the coating on a plug 6 is also achieved the particular advantage that all parameters such as temperature, humidity, and cure times can be kept within narrow limits, which is particularly important by casting, which includes several successive hardening polymer layers, which must properly bind to each other. Before mounting on a wind turbine blade 25, there must occur a treatment of it against the wind turbine blade facing side 8 of the coating 10 in the form of working with sandpaper, such that this surface appears rough and thus has better adhesion by the glueing.

When an older wind turbine blade must be after fitted with a new erosion-resistant coating 10, it is necessary to first clean the surface for foreign matters or loose elements in the usually somewhat eroded surface, which the wind turbine blade has, particularly on areas where the surface hits mostly perpendicularly into the air stream. When the relative speed between wind turbine blade and the air becomes over 150 km/hour, the surface of the wind turbine blade is exposed to significant erosion from items such as earth-dust, insects, salt crystals, rainwater, snow and hail particles. The cleaning can be performed mechanically by blowing with solid particles of plastic, sand or CO2, which is known within surface treatment. Usually, blasting with dry ice or solid CO2 particles will be preferred, since this technique ensures that sediments on the wind turbine blade's surface are not only pushed further into the surface, but are blown away from the surface.

When a coating 10 is molded on a surface of a plug 6, as described here, the molding mass will run down along the sides and here finally form drops 7 on the surface 5. However, the finished casted coating is cut out in suitable distance 13 from these drops, by cutting through the coating in a predetermined distance from the front edge line 21, as indicated in FIG. 4. By the cutting, there is formed a leap in material thickness, which, if it is not processed, may risk to create errors in the airflow around the wind turbine blade 25 after assembly of the coating 10 hereon. Therefore, the edge is sharpened on the inside, that is, the one towards the wind turbine blade 25 facing side 8 with for example sandpaper 23, or is processed with appropriate hand tools as indicated in FIG. 5. Hereby is achieved a gradual transition from the new coating 10 on the wind turbine blade 25 and the original surface, where no coating is present. At the same time, it must be emphasized that sanding from the inside results in that the surface of the new coating has the same structure on its whole, away from the wind turbine blade facing, surface 9, since this is formed by the free-flowing casting compound on the plug's exterior side. Additionally, sanding with sandpaper 23 on the inner side will improve attachment between the wind turbine blade's surface and the coating, such that there is achieved improved attachment by the glueing.

There are several ways whereby a glueing of the new coating 10 on the wind turbine blade's surface can be carried out. It can occur while the blade 25 sits fixed in the nacelle 24 and faces downwards along the turbine tower 26 or it can occur on a dismounted blade, while it lies down with the front edge facing upwards. If there is worked on the wind turbine blade 25 while it is seated in the nacelle 24, it can be anticipated that very long pieces of new coating will be difficult to handle safely and get glued in place.

Therefore, there will in this case be talk of cut off pieces, which are mounted individually after each other. These pieces will typically have a length along the front edge line of between 2 m and 4 m. There is worked from the blade tip, that is the tip end 18 and up along the blade towards the root end 19, since the individual pieces can be formed such that a smaller overlap can be established without, there hereby, occurring unevenness on the blade surface. If there is worked on a taken down turbine blade, the coating can be put on in one total working procedure. No matter if there is worked on a taken down blade or on a blade sitting in the turbine's nacelle 24, both the wind turbine blade's surface and the coating towards the wind turbine blade's facing surface must initially be applied with glue whereafter the two glue covered surfaces are connected. It must occur in a way, which forms fewest possible air enclosures and preferably no air enclosures. It is then preferred that the blade's front edge line and the coating's, hereto equaling front edge line, are initially assembled and that there is hereafter gradually from the front edge line and down along the sides established pressure contact between the wind turbine blade and the, towards the wind turbine blade, facing surface of the coating.

During placing of the coating 10 on a plug 6, there are different important instructions, which must be followed if the result must be approved:

the fiber reinforcement must be placed coherently across front edge line 21, the polymer must be dosed along the front edge line 21 since there by the first casting must occur soaking through of the fiber reinforcement and the polymer must run out of the fiber reinforcement and down along the plug's sides in an even layer, by following casting, there is casted on top of the fiber coating, but after the same method, since there must be poured polymer on the top, and this must hereafter be allowed to run freely from here and down along the sides, the transition between the part of the plug's sides, where there is placed fiber reinforcement, and the part, where there is only polymer must be smoothened before the polymer is hardened through, a suitable polymerisation degree is awaited and the next layer is casted in the same way.

It should be noted that the polishing is a necessary operation, since the polymer's surface tension will otherwise cause that there is formed drops or a bulb by this transition. By molding of the lowermost polymer layer with the fiber reinforcement for itself, and waiting for partial curing of this layer before the next layers, without reinforcement, are casted on, it is furthermore ensured that the fiber reinforcement remains localized in the layer closest to the wind turbine blade's surface. This cannot readily be achieved if there, for example, is casted in a conventional casting mold in one step with injection of the polymer in a, with fiber reinforcement equipped mold cavity. The reinforcement would here risk to swim up in, and lay itself a more or less random location in the injected polymer, and subsequently by the curing, become trapped here. However, it is important for the erosion resistance of the coating that the fiber reinforcement is located a predetermined place in the coating, which is easy to achieve by the prescribed method.

The polymer's surface tension and floating characteristics and viscosity can vary a little depending on batch, temperature and other parameters, so the final thickness of a casted layer is not necessarily quite the same from time to time. Usually, there must 3 more castings on top of the fiber rich layer, before a suiting thickness is established, but more or less castings can occur. Moreover, there can be a little difference between which thickness there is desired to be established, which then lets itself regulate by casting more of less layers on top of each other.

When there is to be casted smaller lengths of coating 10, as will be the case when there is to be produced measured lengths for mounting on a wind turbine blade 25 while this sits in the nacelle 24, this can conveniently be carried out in a total working procedure on a plug 6, which includes the entire part of the blade 25, which is to be coated. Here is initially placed the fiber reinforcement on the plug 6, as previously described, and hereafter the fiber coating is covered with transverse strips of plastic foil 15 in an appropriate width for each measured length. The plastic foil 15 should have a width in the plug's longitudinal direction of 2 to 10 cm, preferably 4 cm. It must extend itself across the front edge line 21 and down along both sides and it must not bind firmly to the polymer. After coating with the plastic foil 15 for each measured length, the molding is continued as previously described. By the first casting, the polymer runs in under the foil and soaks the fiber reinforcement, where the following moldings will be deposited on top of the foil coating.

When the individual measured lengths must be separated, it occurs by cutting through the coating 10 along the plastic foil's brims, since there by the one of the foil's two brims 16, which faces towards the tip end 18 of the plug, is cut from above through the polymer layers, without damaging the fiber reinforcement, while there, by the one of the foil's two brims 17, which faces towards the root end 19, is cut from below or from the, towards the blade facing surface 8, since only the fiber reinforced polymer layer 1 is cut through, and the polymer layers 2,3,4 without fiber reinforcement are left undamaged. This is illustrated in FIG. 8. Subsequently, two successive lengths of coating can be separated as shown in the sectional drawing in FIG. 7, since the transverse plastic foil 15 itself is not tied strongly to the polymer and can therefore be removed without difficulty.

FIG. 8 shows the cut lines along the foil 15's brims 16, 17 before the two cuttings are carried out and the two coating sections have become separated, as they are shown in FIG. 7.

From the tip end 18 and upwards towards the root end 19, a measured length of the coating 10 will then end with a clean fiber reinforced polymer layer 1, since the overlying fiber free polymer layers are placed on a, for following mounting calculated following measured length, of the coating 10. The two lengths can then be set up in succession with polymer layer 2,3,4 overlapping a fiber-reinforced layer 1. Hereby, it becomes possible to achieve an overlap between two consecutive lengths of coatings, without there hereby occurring unevenness, which must subsequently be processed. This is a large advantage, but obviously requires that there is kept track of the individually measured lengths, so they are mounted on the blade in the same order, which they were casted on the plug, such that the joints between them can become optimum, even though the cutting can vary a little from length to length.

When the glueing of the pieces on the wind turbine blade's surface is carried out, both the wind turbine blade 25 and the coating's 10 towards the wind turbine blade's facing surface 8, is applied with glue, and hereafter, the two surfaces are brought together. It is here important that there is chosen a glue, which does not have too powerful a hew, for then it becomes impossible to adjust on the coating's position after the first contact between the glue applied surfaces.

At the tip end 18, the conditions are a little special, for here, the coating must stretch itself the whole way around the blade, so it is here especially important that a certain gliding between the coating and the blade surface is possible during the connection.

When an erosion resistant coating, as described above, must be manufactured, there must be considered which fiber reinforcement, there is to be used, and the final thickness must also be determined. Here, it has been found that bi-ax or tri-ax ax weavings, optionally in combination of mat of the "chopped mat" type works best. It is assumed that the weavings' cell structure with the fibers concentrated along the edges on box-shaped structures help to ensure that for example rain drops' kinetic energy in the impact against the surface is distributed evenly over a larger area, such that the wind turbine blade's original fiber structure, does not in the same degree, become exposed to point shaped loads. Also, the polymer layer will, when the total layer thickness reaches between 1200 µm and 1400 µm protect against surface erosion, since the polymer has high toughness and impact strength. The individual layers must then typically have a thickness of between 100 µm and 400 µm, preferably 200 µm It should be noted that the chosen polymer's two-component self hardening characteristics cause an exothermic process by which the surplus heat must be able to be led away. It puts a damper on how thick a layer there can be casted in each casting process. If the layer thickness becomes too large, the heat cannot escape fast enough, and there can occur zones where the hardening has gone too fast, with weakening of the final coating as a result.

Besides the thickness of the coating, the width of the fiber reinforcement must be determined and it must be determined how long out over the fiber reinforcement the non-reinforced layers should stretch themselves. These measurements can vary across the blade's length concurrently with the blade profile also changing character. It will usually be suiting with a total length from the front edge line to the outermost brim 13 on the fiber free layers, which are placed between 10 and 15 cm. If the blade is wider, a longer distance to the outermost brim can however be a possibility.

As it is seen in FIG. 12, the blade profile will, when it is seen from either the front edge or the rear edge, bend somewhat and not follow a straight line 30, which for the sake of illustration is shown in FIG. 12 and in FIG. 10. It is an additional reason for the casting having to be carried out on a plug 6, which follows this bend.

In this exposition, there is taken basis in a manufacturing based on manual completion of the different steps in the manufacturing of the coating, but the coating can also be manufactured mechanically. Here, a plug, with the to the blade profile's front edge facing side directed upwards, is brought to be moved relatively in relation to one or more work stations, where there by each work station is carried out a part of the manufacturing process. For example, the following work stations are provided: a cleaning station, a station for spraying on booth coat, a station for fitting of fiber mat, a number of stations for application of polymer. For each operation, the plug and a work station are moved in relation to each other, such that the work station can process the whole plug's length, however time controlled such that there is taken consideration for hardening or drying times for the substances, which are included in the process. Polishing operations are not included here, since they can possibly be fully avoided by for example very precise dosing of polymer in the profile's transverse direction. Some work stations can be equipped with robot equipment, which includes one, two or more robot arms, or other very flexible equipment, such that a such work station can easily be reconfigured for carrying out many different work processes, optionally there is only found one work station, which is then reconfigured between each work task. The work station can for example be designed as a bridge, which goes across the plug, and on each side hereof is supported by each own rail vehicle, which can propel bridges on rails, which are placed on each side of the plug in its whole length. Alternatively, the plug is mounted on rails, such that it is movable in its longitudinal direction past one or more, along the rails mounted, stationary work stations. One of the advantages of mechanical formation of the coating can be that the work area can fully be kept free of people, such that no persons are exposed to potential toxic effects of the substances, which are included in the work processes.

When a finished casted coating first sits on a wind turbine blade 25 in a wind turbine 27, there will firstly be a glue layer, then a fiber reinforced polymer layer 1, then one or more non-reinforced polymer layers 2,3,4 since however the polymer layers 2,3,4 stretch themselves past the fiber reinforced layer 1 and sit glued to areas on the wind turbine blade 25, which are less exposed to erosion. It is especially important that the fiber reinforced polymer layer 1 sits just there, where the erosion strain is highest, for in that way, the optimum protection effect of the coating 10 is achieved. On the front edge of the blade 25, the fiber reinforcement will then be placed there where the wind hits perpendicularly against the surface when the wind turbine blade 25 is in operation and this line thus forms the center axis 28 for the coating 10. From the center axis 28, the coating stretches itself out and down along the sides of the blade profile. A distance down along the profile, to each side, the coating hereafter passes to a reinforcement free polymer coating 2,3,4.

The last part of the reinforcement free polymer layers on the blade will then additionally have a gradually decreasing material thickness, due to the finishing by sanding, out towards the final end 13 of the coating 10. This detail ensures that there does not come any significant rough spots in the surface, when the coating 10 is mounted and thereby is avoided potential interruptions of the air's flow around the blade. It also becomes possible to set up the coating without any form of finishing, which, especially by mounting on a blade, which is not taken down, has high importance, since it ensures that the mounting can occur with least possible interruption of the wind turbine's operation, since the mounting occurs by least possible time consumption per meter of blade profile.

REFERENCE NUMBERS

1 Fiber reinforced polymer layer
2 Second polymer layer
3 Third polymer layer
4 Fourth polymer layer
5 Mould surface
6 Plug
7 Drops
8 Towards the blade facing surface
9 Away from the blade facing surface
10 Coating
11 Arrow
12 Arrow
13 Predetermined place on the outer side/the polymer layers' brim
14 Ending brim area
15 Transverse plastic foil
16 Towards the tip end facing foil brim
17 Towards the root end facing foil brim
18 The tip end
19 The root end
20 Tangent
21 Front edge line
22 Excess piece
23 Sandpaper
24 Nacelle
25 Wind turbine blade
26 Turbine tower
27 Wind turbine
28 Center axis
29 Rear edge
30 Straight line

The invention claimed is:

1. A method for establishing of an erosion resistant surface part on a wind turbine blade (25), said method comprising:
   a) making a plug (6) of an outer geometry of a surface of the wind turbine blade;
   b) orientating the plug (6) in a room such that a front edge of the plug faces upwards, whereby a tangent (20) to the front edge forms a horizontal line and touch points between horizontal tangents (20) and the plug (6) form a front edge line (21);
   c) coating the plug (6) with a release agent and/or other surface treatment, which allows casting on, and subsequent demoulding from, a surface of the plug;
   d) forming an erosion resistant coating by casting a cohesive glass fibre mat on the plug (6) across the front edge line (21) and a predetermined length from the front edge line and down along two sides of the plug;
   e) after casting the cohesive glass fibre mat on the plug, casting at least one layer which includes a hardening polymer directly on the plug after the following steps:
      1) plentifully dosing a non-fibre polymer along the front edge line (21) of the plug down in/on the glass fibre mat such that the non-fiber polymer runs out of the glass fibre mat and down along the two sides of the plug,
      2) burnishing a transition between the glass fibre mat and the non-fibre polymer,
      3) waiting a necessary amount of time for polymerisation to take place, thereafter repeating steps 1, 2 and 3 until a predetermined layer thickness is created and forming non-fibre layers (2, 3, 4);
   f) ejecting the erosion resistant coating (10) from the plug (6); and
   g) glueing the erosion resistant coating (10) onto the surface of the wind turbine blade as the erosion resistant surface part, placing a front edge line of the erosion resistant coating level with a corresponding front edge line of the wind turbine blade.

2. The method, according to claim 1, further including blasting the surface of the wind turbine blade with particles of $CO_2$ in solid form in advance of mounting of the erosion resistant coating (10).

3. The method, according to claim 2, further including reworking the plug (6) and the ejected erosion resistant coating (10) by cutting off a surplus piece (22) at both sides at a predetermined distance (11,12) from the front edge line (21) of the plug and thinning a brim formed by the cutting off of the surplus piece at an inner side of the brim by polishing.

4. The method according to claim 1, further including manufacturing predetermined lengths of the erosion resistant coating and individually mounting the predetermined lengths of the erosion resistant coating in continuation of each other from a wind turbine blade tip end (18) and upwards on the wind turbine blade while the wind turbine blade is vertically suspended from a nacelle (24).

5. The method according to claim 4 further including for each predetermined length of erosion resistant coating manufactured along the plug (6), covering the glass fibre mat with a transverse plastic foil (15) having a first brim (17) facing towards a wind turbine blade root end (19), each having a second brim (16) facing towards the wind turbine blade tip end (18) and a fixed predetermined expanse in a longitudinal direction of the plug, the transverse plastic foil (15) proceeds from the front edge line (21) of the plug and down along each of the two sides of the plug (6);

whereafter dosing the non-fibre polymer; and after the non-fibre polymer layers softens, cuffing free a predetermined piece of the erosion resistant coating from a previous piece along the transverse plastic, foil (15) such that along the foil first brim (17) only a glass fibre reinforced layer (1) is cut through and along the foil second brim (16) only the non-fibre polymer layers (2,3,4) above the glass fibre reinforced layer (1) are cut through, and such that the erosion resistant coating has two pieces separated by a slip between the transverse plastic foil (15) and the non-fibre polymer layers, whereby one end of the two pieces ends with a fibre edge without polymer over casting and the other end of the two pieces ends with a polymer edge without the glass fibre reinforced layer (1).

6. The method according to claim 5 wherein the manufactured predetermined lengths of cast erosion resistant coating are put on the surface of the wind turbine blade from the wind turbine blade tip end (18) with the fibre edge without polymer over casting facing towards the wind turbine blade root end (19), such that a next piece of the manufactured predetermined length of cast erosion resistant coating is put on with the polymer edge without the glass fibre reinforced layer overlapping the previous fibre edge.

7. The method according to claim 1, further including manufacturing a whole erosion resistant coating and cohesively mounting the whole erosion resistant coating to the wind turbine blade (25) while the wind turbine blade is dismounted from a nacelle and lies down.

8. The method according to claim 1, further including applying the glue to a side of the erosion resistant coating (10) facing the surface of the wind turbine blade and, to the wind turbine blade surface in advance of joining the erosion resistant coating to the surface of the wind turbine blade.

9. The method according to claim 1, further including manufacturing a coating for a wind turbine blade tip end (18), wherein the cohesive glass fibre mat stretches around the entire wind turbine blade tip end.

10. A method for manufacturing of an erosion resistant surface part for a wind turbine blade (25), said method comprising:
   a) making a plug (6) of an outer geometry of a surface of the wind turbine blade;
   b) orientating the plug (6) in a room such that a front edge of the plug faces upwards, whereby a tangent (20) to the front edge forms a horizontal line and touch points between horizontal tangents (20) and the plug (6) form a front edge line (21);
   c) coating the plug (6) with a release agent and/or other surface treatment, which allows casting on, and subsequent demoulding from, a surface of the plug;
   d) forming an erosion resistant coating by casting a cohesive glass fibre mat on the plug (6) across the front edge line (21) and a predetermined length from the front edge line (21) and down along two sides of the plug;
   e) after casting the cohesive glass fibre mat on the plug, casting at least one layer which includes a hardening non-fibre polymer on the plug after the following steps:
      (1) plentifully dosing a non-fibre polymer along the front edge line (21) of the plug down in/on the glass fibre mat such that the non-fibre polymer runs out of the glass fibre mat and down along the two sides of the plug,
      (2) burnishing a transition between the glass fibre mat and the non-fibre polymer,
      (3) waiting a necessary amount of time for polymerisation to take place, thereafter repeating steps 1, 2 and 3 until a predetermined layer thickness is created and forming non-fibre lavers (2,3,4); and
   f) ejecting the erosion resistant coating (10) from the plug (6) as the erosion resistant surface part.

11. The method according to claim 10, further manufacturing a coating for a wind turbine blade tip end (18), wherein the cohesive glass fibre mat stretches around the entire wind turbine blade tip end.

12. The method according to claim 10 further including manufacturing predetermined lengths of erosion resistant coating and for each along the plug (6) covering the glass fibre mat with a transverse plastic foil (15) having a first brim (17) facing towards a wind turbine blade root end (19) and each having a second brim (16) facing towards a wind turbine blade tip end (18) and a fixed predetermined expanse in a longitudinal direction of the plug, the transverse plastic foil (15) proceeds from the front edge line (21) and down along each of the two sides of the plug (6);

whereafter dosing the non-fibre polymer; and after the non-fibre polymer layers softens, cutting free a predetermined piece of the erosion resistant coating from a previous piece along the transverse plastic foil (15) such that along the foil first brim (17) only a glass fibre reinforced layer (1) is cut through and along the foil second brim (16) only the non-fibre polymer layers (2,3,4) above the glass fibre reinforced layer (1) are cut through, and such that the erosion resistant coating has two pieces separated by a slip between the transverse plastic foil (15) and the non-fibre polymer layer, whereby one end of the two pieces ends with a fibre edge without polymer over casting and the other end of the two pieces ends with a polymer edge without the glass fibre reinforced layer (1).

* * * * *